United States Patent [19]
Valet et al.

[11] Patent Number: 5,668,200
[45] Date of Patent: Sep. 16, 1997

[54] STABILIZER COMBINATION

[75] Inventors: Andreas Valet, Binzen, Germany; Gerhard Rytz, Bern; Pascal Hayoz, Marly, both of Switzerland

[73] Assignee: Ciba-Geigy Corporation, Tarrytown, N.Y.

[21] Appl. No.: 586,267

[22] Filed: Jan. 16, 1996

[30] Foreign Application Priority Data

Jan. 18, 1995 [CH] Switzerland ............... 139/95

[51] Int. Cl.$^6$ ............................................. C08K 5/3492
[52] U.S. Cl. ..................... 524/100; 524/91; 524/102; 252/401; 252/402; 252/403
[58] Field of Search ....................... 252/401, 402, 252/403; 524/91, 100, 102

[56] References Cited

U.S. PATENT DOCUMENTS

| | | | |
|---|---|---|---|
| 3,118,887 | 1/1964 | Hardy | 260/248 |
| 3,244,708 | 4/1966 | Dünnenberger | 260/248 |
| 3,249,608 | 5/1966 | Biland | 260/248 |
| 3,423,360 | 1/1969 | Huber et al. | 524/100 |
| 3,843,371 | 10/1974 | Piller | 96/84 |
| 4,619,956 | 10/1986 | Susi | 524/87 |
| 4,826,978 | 5/1989 | Migdal | 544/216 |
| 5,106,891 | 4/1992 | Valet | 524/91 |
| 5,288,778 | 2/1994 | Schmitter et al. | 524/100 |
| 5,322,868 | 6/1994 | Valet et al. | 524/100 |
| 5,364,749 | 11/1994 | Leppard et al. | 430/507 |
| 5,369,140 | 11/1994 | Valet et al. | 524/100 |
| 5,376,710 | 12/1994 | Slongo et al. | 524/100 |
| 5,461,151 | 10/1995 | Waterman | 524/100 |

FOREIGN PATENT DOCUMENTS

| | | |
|---|---|---|
| 434608 | 6/1991 | European Pat. Off. . |
| 0442847 | 8/1991 | European Pat. Off. . |
| 480090 | 12/1969 | Switzerland . |
| 484695 | 3/1970 | Switzerland . |
| 2273498 | 6/1994 | United Kingdom . |
| 2278115 | 11/1994 | United Kingdom . |
| 9418278 | 8/1994 | WIPO . |

OTHER PUBLICATIONS

Chemical Abstract 119, 213920n(1993).

Chem. Abst. 90534r of CH 480,090.

*Primary Examiner*—Kriellion S. Morgan
*Attorney, Agent, or Firm*—Luther A. R. Hall

[57] ABSTRACT

A mixture comprising a compound of the formula I and a compound of the formula II

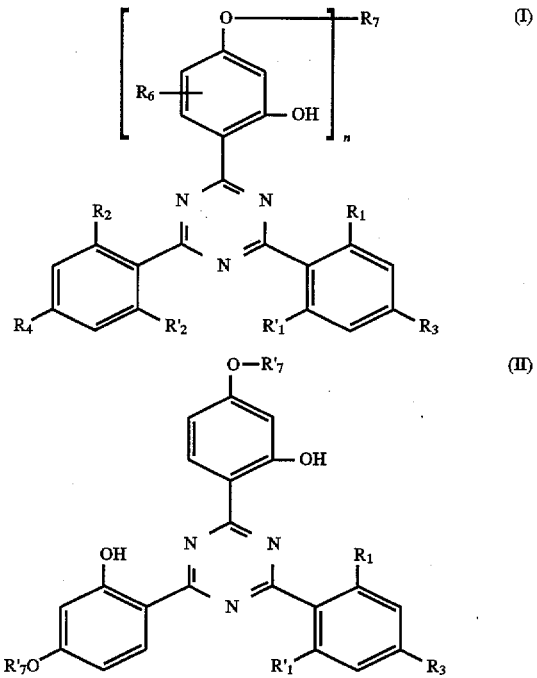

in which n is 1 or 2;

$R_1$, $R'_1$, $R_2$, $R'_2$, $R_3$ and $R_4$, independently of one another, are H, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_6$ is hydrogen, $C_1$–$C_{24}$alkyl, $C_5$–$C_{12}$cycloalkyl or $C_7$–$C_{15}$phenylalkyl;

$R_7$, in the case where n=1, and $R'_7$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_8$, —CONH$_2$, —CONHR$_9$, —CON(R$_9$)(R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O— and may be substituted by OH; or $R_7$ is $C_3$–$C_6$alkenyl; glycidyl; $C_5$–$C_{12}$cycloalkyl; cyclohexyl which is substituted by OH, $C_1$–$C_4$alkyl or —OCOR$_{11}$; $C_7$–$C_{11}$phenylalkyl which is unsubstituted or substituted by OH, Cl or CH$_3$; —CO—R$_{12}$ or —SO$_2$—R$_{13}$;

and $R_7$, in the case where n=2, and $R_8$ to $R_{23}$ are as defined in claim 1, is highly suitable for stabilizing organic material.

13 Claims, No Drawings

STABILIZER COMBINATION

The invention relates to a novel stabilizer mixture comprising mono- and bisresorcinyltriazines, to organic material stabilized with the aid of this mixture against damage by light, heat and oxygen and to the corresponding use of the mixture as a stabilizer for organic material.

If it is desired to increase the light stability of an organic material, in particular a coating, a light stabilizer is usually added. A class of light stabilizers which is very frequently employed comprises the UV absorbers, which protect the material by absorbing the harmful radiation via chromophores. An important group of UV absorbers is the triphenyltriazines, as described, inter alia, in EP-A-434 608, EP-A-520 938, U.S. Pat. No. 4 619 956, EP-A-483 488, EP-A-500 496, EP-A-502 816 and EP-A-506 615. Some bisresorcinyl derivatives from this group are mentioned, for example, in CH-A-480 090, CH-A-484 695, U.S. Pat. No. 3 249 608, U.S. Pat. No. 3 244 708, U.S. Pat. No. 3 843 371, U.S. Pat. No. 4 826 978, EP-A-434 608, EP-A-520 938, GB-A-2 273 498 and WO-A-94/18 278

Stabilizer mixtures comprising UV absorbers of the triphenyltriazine and o-hydroxyphenylbenzotriazole type have also already been proposed (EP-A-453 396).

It has now been found that mixtures comprising 2 different types of stabilizer from the triphenyltriazine class surprisingly have particularly good stabilizer properties.

The invention therefore relates to a mixture comprising a compound of the formula I

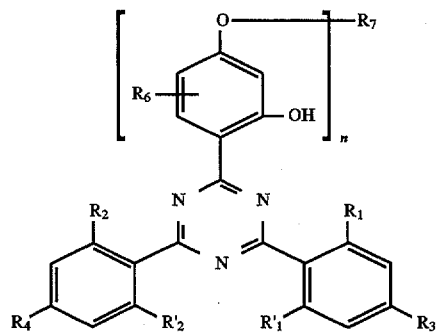

and a compound of the formula II

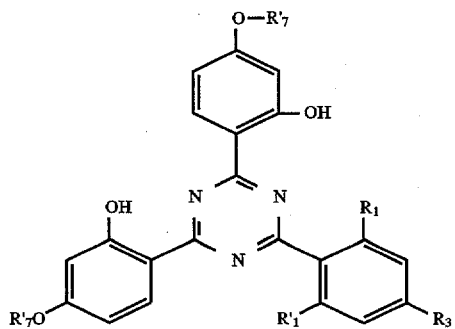

in which n is 1 or 2;

$R_1$, $R'_1$, $R_2$ and $R'_2$, independently of one another, are H, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_3$ and $R_4$, independently of one another, are H, $C_1$–$C_{12}$alkyl; $C_2$–$C_6$alkenyl; $C_1$–$C_{12}$alkoxy; $C_5$–$C_{12}$cycloalkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_6$ is hydrogen, $C_1$–$C_{24}$alkyl, $C_5$–$C_{12}$cycloalkyl or $C_7$–$C_{15}$phenylalkyl;

$R_7$, in the case where n=1, and $R'_7$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_8$, —CONH$_2$, —CONHR$_9$, —CON(R$_9$)(R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O— and may be substituted by OH; or $R_7$ is $C_3$–$C_6$alkenyl; glycidyl; $C_5$–$C_{12}$cycloalkyl; cyclohexyl which is substituted by OH, $C_1$–$C_4$alkyl or —OCOR$_{11}$; $C_7$–$C_{11}$phenylalkyl which is unsubstituted or substituted by OH, Cl or CH$_3$; —CO—R$_{12}$ or —SO$_2$—R$_{13}$; $R_7$, in the case where n=2, is $C_2$–$C_{16}$alkylene, $C_4$–$C_{12}$alkenylene, xylylene, $C_3$–$C_{20}$alkylene which is interrupted by O and/or substituted by OH, or is a group of the formula —CH$_2$CH(OH)CH$_2$O—R$_{20}$—OCH$_2$CH(OH)CH$_2$—, —CO—R$_{21}$—CO—, —CO—NH—R$_{22}$—NH—CO— or —(CH$_2$)$_m$—COO—R$_{23}$—OOC—(CH$_2$)$_m$—, in which m is a number in the range from 1 to 3, or is

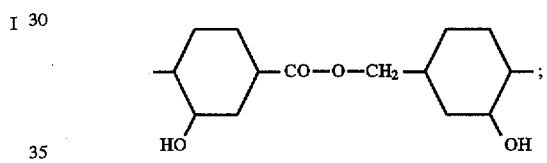

$R_8$ is $C_1$–$C_{18}$alkyl; $C_2$–$C_{18}$alkenyl; $C_3$–$C_{50}$alkyl which is interrupted by O, NH, NR$_9$ or S and/or is substituted by OH; $C_1$–$C_4$alkyl which is substituted by —P(O)(OR$_{14}$)$_2$, —N(R$_9$)(R$_{10}$) or —OCOR$_{11}$ and/or OH; glycidyl; cyclohexyl; phenyl; $C_7$–$C_{14}$alkylphenyl or $C_7$–$C_{11}$phenylalkyl;

$R_9$ and $R_{10}$, independently of one another, are $C_1$–$C_{12}$alkyl; $C_3$–$C_{12}$alkoxyalkyl; $C_4$–$C_{16}$dialkylaminoalkyl or $C_5$–$C_{12}$cycloalkyl, or $R_9$ and $R_{10}$ together are $C_3$–$C_9$alkylene or -oxaalkylene or-azaalkylene;

$R_{11}$ is $C_1$–$C_{18}$alkyl; $C_2$–$C_{18}$alkenyl or phenyl; or is $C_3$–$C_{50}$alkyl which is interrupted by —O— and may be substituted by OH;

$R_{12}$ is $C_1$–$C_{18}$alkyl; $C_2$–$C_{18}$alkenyl; phenyl; $C_1$–$C_{18}$alkoxy; $C_3$–$C_{18}$alkenyloxy; $C_3$–$C_{50}$alkoxy which is interrupted by O, NH, NR$_9$ or S and/or substituted by OH; cyclohexyloxy; $C_7$–$C_{14}$alkylphenoxy; $C_7$–$C_{11}$phenylalkoxy; phenoxy; $C_1$–$C_{12}$alkylamino; phenylamino; tolylamino or naphthylamino;

$R_{13}$ is $C_1$–$C_{12}$alkyl; phenyl; naphthyl or $C_7$–$C_{14}$alkylphenyl;

$R_{14}$ is $C_1$–$C_{12}$alkyl, methylphenyl or phenyl;

$R_{20}$ is $C_2$–$C_{10}$alkylene; $C_4$–$C_{50}$alkylene which is interrupted by O, phenylene or a -phenylene-X-phenylene- group, in which X is —O—, —S—, —SO$_2$—, —CH$_2$— or —C(CH$_3$)$_2$—;

$R_{21}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;

$R_{22}$ is $C_2$–$C_{10}$alkylene, phenylene, tolylene, diphenylenemethane or a

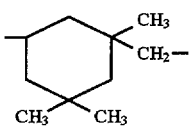

group; and $R_{23}$ is $C_2$-$C_{10}$alkylene or $C_4$-$C_{20}$alkylene which is interrupted by O.

Of particular industrial interest are mixtures of compounds of the formulae I and II whose hydroxyl groups in the p- position to the triazinyl ring are etherified or esterified, i.e. whose radicals $R_7$ are not hydrogen.

A halogen substituent is —F, —Cl, —Br or I; preferably —F or —Cl, in particular —Cl.

Alkylphenyl is alkyl-substituted phenyl; $C_7$-$C_{14}$alkylphenyl includes, for example, methylphenyl (tolyl), dimethylphenyl (xylyl), trimethylphenyl (mesityl), ethylphenyl, propylphenyl, butylphenyl, dibutylphenyl, pentylphenyl, hexylphenyl, heptylphenyl and octylphenyl.

Phenylalkyl is phenyl-substituted alkyl; $C_7$-$C_{11}$phenylalkyl includes, for example, benzyl, α-methylbenzyl, α,α-dimethylbenzyl, phenylethyl, phenylpropyl, phenylbutyl and phenylpentyl.

Glycidyl is 2,3-epoxypropyl.

Alkyl which is interrupted by O, NH, $NR_9$ or S and may be substituted by OH can in general contain one or more of said hetero atoms, although oxygen, nitrogen and sulfur atoms cannot be adjacent to one another. In general, hetero atoms in the alkyl chain and hydroxyl are not vicinal; a carbon atom in the alkyl chain is preferably bonded to at most 1 oxygen, nitrogen or sulfur atom.

Alkyl $R_1$, $R'_1$, $R'_2$, $R_2$, $R_3$, $R_4$, $R_7$, $R'_7$, $R_8$, $R_9$, $R_{10}$, $R_{11}$, $R_{12}$, $R_{13}$ and $R_{14}$ are, within the stated definitions, branched or unbranched alkyl, such as methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl. Alkyl $R_1$, $R'_1$, $R_2$, $R'_2$, $R_3$, $R_4$, $R_8$, $R_9$, $R_{10}$, $R_{11}$, $R_{12}$, $R_{13}$ and $R_{14}$ are preferably short-chain, for example $C_1$-$C_8$alkyl, in particular $C_1$-$C_4$alkyl, such as methyl or butyl.

$R_1$, $R'_1$, $R'_2$, $R_2$, $R_3$ and $R_4$ are, independently of one another, particularly preferably hydrogen, methyl, methoxy, ethyl or isopropyl, in particular hydrogen or methyl.

$C_4$-$C_{16}$dialkylaminoalkyl $R_9$ or $R_{10}$ is alkyl which is substituted by dialkylamino, where the entire radical contains 4 to 16 carbon atoms. Examples thereof are $(CH_3)_2N$—$CH_2CH_2$—; $(C_2H_5)_2N$—$CH_2CH_2$—; $(C_3H_7)_2N$—$CH_2CH_2$—; $(C_4H_9)_2N$—$CH_2CH_2$—; $(C_5H_{11})_2N$—$CH_2CH_2$—; $(C_6H_{13})_2N$—$CH_2CH_2$—; $(CH_3)_2N$—$CH_2CH_2CH_2$—; $(C_2H_5)_2N$—$CH_2CH_2CH_2$—; $(C_3H_7)_2N$—$CH_2CH_2CH_2$—; $(C_4H_9)_2N$—$CH_2CH_2CH_2$—; $(C_5H_{11})_2N$—$CH_2$— and $(C_6H_{13})_2N$—$CH_2CH_2CH_2$—.

$C_3$-$C_9$alkylene or -oxaalkylene or -azaalkylene $R_9$ and $R_{10}$ together are, together with the nitrogen atom to which they are bonded, generally a 5- to 9-membered ring which contains 3 to 9 carbon atoms and may contain further nitrogen or oxygen atoms, although directly adjacent nitrogen and/or oxygen atoms (structures of hydrazine, oxylamine or peroxide type) are excluded. Examples thereof include pyrrolidino, piperidino, piperazino and morpholino.

The novel mixture frequently comprises compounds of the formulae I and II whose radicals of the same name within the stated definition are different; for example, the novel mixture can be, for example, a mixture of a compound of the formula I in which $R_1$, $R_2$, $R_3$ and $R_4$ are hydrogen and a compound of the formula II in which $R_1$ and $R_3$ are methyl. Of particular industrial interest are mixtures of compounds of the formulae I and II in which radicals having the same name have identical meanings.

Likewise of particular interest for use in the novel mixtures are compounds of the formula I in which $R_1$ and $R_2$ are identical and in which $R_3$ and $R_4$ are likewise identical and in which $R'_1$ and $R'_2$ are likewise identical, in particular those in which $R_1$ to $R_4$ are methyl and $R'_1$ and $R'_2$ are hydrogen or methyl. n is preferably 1.

Unsubstituted or substituted $C_5$-$C_{12}$cycloalkyl $R_7$ and $R'_7$ are, for example, cyclopentyl, cyclohexyl, cycloheptyl, cyclooctyl, cyclododecyl, methylcyclohexyl or acetoxycyclohexyl, preferably cyclohexyl or cyclododecyl.

If alkyl radicals carry further substituents or if individual radicals are alkylene, free valences and bonds to substituents can emanate from the same or different carbon atoms. Bonds to hetero atoms preferably emanate from different carbon atoms.

Thus, substituted $C_1$-$C_{12}$alkyl $R_7$ and $R'_7$ include, for example, hydroxyalkyl, such as 2-hydroxyethyl, 3-hydroxypropyl or 2-hydroxypropyl; alkoxyhydroxyalkyl such as 2-hydroxy-3-methoxypropyl, 2-hydroxy-3-ethoxypropyl, 2-hydroxy-3-butoxypropyl, 2-hydroxy-3-hexyloxypropyl or 2-hydroxy-3-(2-ethylhexyloxy)propyl; alkoxycarbonylalkyl, such as methoxycarbonylmethyl, ethoxycarbonylmethyl, butoxycarbonylmethyl, octyloxycarbonylmethyl, 1-octyloxycarbonyl-1-methylmethyl, 1-octyloxycarbonyl-1-ethylmethyl or 1-octyloxycarbonyl-1-hexylmethyl; or alkanoyloxyalkyl or alkenoyloxyalkyl, such as 2-(acetoxy)ethyl, 2-acryloxyethyl or 2-methacryloxyethyl; or, for example, 3-acryloxy- or 3-methacryloxy-2-hydroxypropyl.

$R_7$ and $R'_7$ as alkyl which is substituted by OH, alkoxy, phenoxy, —$COOR_8$ and/or —$OCOR_{11}$ include, for example, the following meanings: —$CH_2CH(OH)CH_2O$—$R_{19}$, in which $R_{19}$ is as defined above for alkyl or can be, for example, phenyl, acetyl, propionyl, acryloyl or methacryloyl; or alkoxycarbonylalkyl; examples which may be mentioned of such radicals are —$CH_2CH_2OCOCH=CH_2$, —$CH_2CH(OH)C_8H_{17}$, —$CH_2CH(OH)C_{12}H_{25}$, —$CH_2CH(OH)CH_2O$—n—$C_8H_{17}$, —$CH_2CH(OH)CH_2O$—$C_6H_5$, —$CH_2CH(OH)CH_2O$—$CH_2CH(C_2H_5)$—$(CH_2)_3$—$CH_3$, —$CH_2CH(OH)CH_2O$—$(CH_2)_{12-14}$—$CH_3$, —$OCH_2CH(OH)CH_2OCOC(CH_3)=CH_2$ and —$OCH_2CH(OH)CH_2OCOCH=CH_2$.

$R_7$, $R'_7$, $R_8$ and $R_{11}$ as alkyl which is interrupted by O and may be substituted by OH can be interrupted by one or more O and substituted by one or more OH. These radicals are preferably interrupted by more than one O, for example 2–12 oxygen atoms, and are preferably unsubstituted or substituted by 1–2 OH. In this definition, $R_8$ and $R_{11}$ preferably conform to the formula —$(CH_2CHR_{15}$—$O)_i$—$R_{18}$, and $R_7$ and $R'_7$ preferably conform to one of the formulae —$(CH_2CHR_{15}$—$O)_i$—$R_{18}$ or —$CH_2$—$CH(OH)$—$CH_2$—$O$—$(CH_2CHR_{15}$—$O)_i$—$R_{18}$, where i is a number in the range from 1 to 16, especially in the range from 2 to 12, especially in the range from 4 to 10, $R_{15}$ is H or methyl, and $R_{18}$ is H, $C_1$-$C_{18}$alkyl, phenyl or $C_7$-$C_{10}$alkylphenyl. A typical example of such radicals is polyoxyethylene, for example having 4–10 ethylene oxide units, which carries a free hydroxyl group at the chain end or is saturated by alkyl.

$R_6$ is preferably either hydrogen or the radical is in position 5 (p-position to OH and o-position to $OR_7$). Of particular importance are compounds in which $R_6$ is hydrogen, $C_1$-$C_{10}$alkyl or $C_7$-$C_{15}$phenylalkyl, in particular hydrogen.

Alkenyl $R_1$, $R_2$, $R_3$, $R_4$, $R_7$, $R_8$, $R_{11}$ and R12 within the stated definitions include allyl, isopropenyl, 2-butenyl, 3-butenyl, isobutenyl, n-penta-2,4-dienyl, 3-methylbut-2-enyl, n-oct-2-enyl, n-dodec-2-enyl, isododecenyl, n-octadec-2-enyl and n-octadec-4-enyl. $R_7$, $R_{11}$ and $R_{12}$ can also be, for example, vinyl. Alkenyl $R_{11}$ and $R_{12}$ are particularly preferably —CH=CH$_2$ or —C(CH$_3$)=CH$_2$.

Aryl is generally an aromatic hydrocarbon radical, for example phenyl, biphenyl or naphthyl. Aralkyl generally denotes aryl-substituted alkyl; thus $C_7$–$C_{12}$aralkyl includes, for example, benzyl, phenylethyl, phenylpropyl, phenylbutyl, phenylpentyl and phenylhexyl, preferably benzyl and α-methylbenzyl. Alkylaryl is alkyl-substituted aryl; $C_7$–$C_{18}$alkylaryl includes methylphenyl (tolyl), dimethylphenyl (xylyl), trimethylphenyl, tetramethylphenyl, pentamethylphenyl, ethylphenyl, propylphenyl (for example cumyl), butylphenyl (for example tert-butylphenyl), methylbutylphenyl, dibutylphenyl, pentylphenyl, hexylphenyl, dihexylphenyl, heptylphenyl, octylphenyl, nonylphenyl, decylphenyl, undecylphenyl, dodecylphenyl, methylnaphthyl, dimethylnaphthyl, ethylnaphthyl, propylnaphthyl, butylnaphthyl, pentylnaphthyl, hexylnaphthyl, heptylnaphthyl and octylnaphthyl; of these, toyl, Xylyl, Propylphenyl and butylphenyl, for example, are of particular importance.

The invention relates, for example, to a mixture comprising a compound of the formula I'

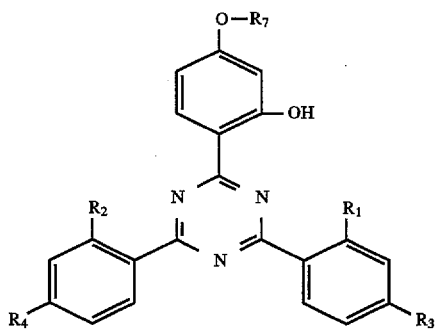

and a compound of the formula II'

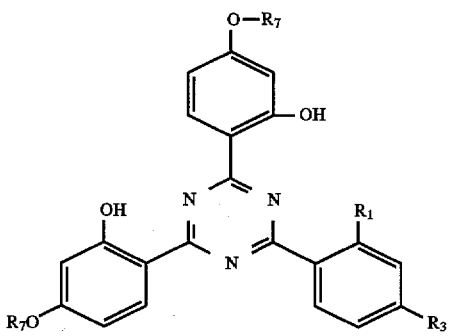

in which $R_1$ and $R_2$, independently of one another, are H, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_3$ and $R_4$, independently of one another, are H, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_7$ is hydrogen or $C_1$–$C_{18}$alkyl; or is $C_1$–$C_{12}$alkyl which is substituted by OH, $C_1$–$C_{18}$alkoxy, halogen, —COOH, —COOR$_8$, —CONH$_2$, —CONHR$_9$, —CON(R$_9$)(R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O— and may be substituted by OH; or $R_7$ is $C_3$–$C_6$alkenyl; glycidyl; $C_5$–$C_{12}$cycloalkyl; cyclohexyl which is substituted by OH, $C_1$–$C_4$alkyl or —OCOR$_{11}$; $C_7$–$C_{11}$phenylalkyl which is unsubstituted or substituted by OH, Cl or CH$_3$; —CO—R$_{12}$ or —SO$_2$—R$_{13}$;

$R_8$ is $C_1$–$C_{18}$alkyl; $C_2$–$C_{18}$alkenyl; $C_3$–$C_{50}$alkyl which is interrupted by O, NH, NR$_9$ or S and/or is substituted by OH; $C_1$–$C_4$alkyl which is substituted by —P(O)(OR$_{14}$)$_2$, —N(R$_9$)(R$_{10}$) or —OCOR$_{11}$ and/or OH; glycidyl; cyclohexyl; phenyl; $C_7$–$C_{14}$alkylphenyl or $C_7$–$C_{11}$phenylalkyl;

$R_9$ and $R_{10}$, independently of one another, are $C_1$–$C_{12}$alkyl; $C_3$–$C_{12}$alkoxyalkyl; $C_4$–$C_{16}$dialkylaminoalkyl or $C_5$–$C_{12}$cycloalkyl, or $R_9$ and $R_{10}$ together are $C_3$–$C_9$alkylene or -oxaalkylene or -azaalkylene;

$R_{11}$ is $C_1$–$C_{18}$alkyl; $C_2$–$C_{18}$alkenyl or phenyl; or is $C_3$–$C_{50}$alkyl which is interrupted by —O— and may be substituted by OH;

$R_{12}$ is $C_1$–$C_{18}$alkyl; $C_2$–$C_{18}$alkenyl; phenyl; $C_1$–$C_{12}$alkoxy; phenoxy; $C_1$–$C_{12}$alkylamino; phenylamino; tolylamino or naphthylamino;

$R_{13}$ is $C_1$–$C_{12}$alkyl; phenyl; naphthyl or $C_7$–$C_{14}$alkylphenyl; and $R_{14}$ is $C_1$–$C_{12}$alkyl, methylphenyl or phenyl.

The novel mixtures comprise from 0.2 to 5 parts by weight, in particular from 0.3 to 3 parts by weight, of a compound of the formula II per part by weight of a compound of the formula I.

Preference is given to mixtures of compounds of the formulae I and II in which $R_1$, $R'_1$, $R'_2$ and $R_2$, independently of one another, are H, $C_1$–$C_4$alkoxy or $C_1$–$C_4$alkyl;

$R_3$ and $R_4$, independently of one another, are H, $C_1$–$C_{12}$alkyl, $C_2$–$C_6$alkenyl, $C_1$–$C_{12}$alkoxy, Cl, F, phenyl or phenoxy;

$R_7$, in the case where n=1, and $R'_7$ are hydrogen, $C_1$–$C_{18}$alkyl, allyl, glycidyl or benzyl; or are $C_1$–$C_{12}$alkyl which is substituted by OH, $C_1$–$C_{18}$alkoxy, phenoxy, —COOR$_8$, —CONHR$_9$, —CON(R$_9$)(R$_{10}$) und/or —OCOR$_{11}$; or $R_7$ is —(CH$_2$CHR$_{15}$—O)$_i$—R$_{18}$ or —CH$_2$—CH(OH)—CH$_2$—O—(CH$_2$CHR$_{15}$—O)$_i$—R$_{18}$, where i is a number in the range from 1 to 12;

$R_7$, in the case where n=2, is $C_2$–$C_{16}$alkylene, $C_4$–$C_{12}$alkenylene, xylylene, or $C_3$–$C_{20}$alkylene which is interrupted by O and/or is substituted by OH;

$R_8$ is $C_1$–$C_{12}$alkyl; $C_3$–$C_{20}$alkenyl; $C_3$–$C_{20}$alkyl which is interrupted by O and/or is substituted by OH; or $C_1$–$C_4$alkyl which is substituted by —P(O)(OR$_{14}$)$_2$;

$R_9$ and $R_{10}$, independently of one another, are $C_1$–$C_8$alkyl or cyclohexyl; or $R_9$ and $R_{10}$ together are pentamethylene or 3-oxapentamethylene;

$R_{11}$ is $C_1$–$C_8$alkyl, $C_2$–$C_5$alkenyl or phenyl; or is $C_3$–$C_{20}$alkyl which is interrupted by —O— and may be substituted by OH;

$R_{14}$ is $C_1$–$C_4$alkyl;

$R_{15}$ is H or methyl; and $R_{18}$ is H, $C_1$–$C_{18}$alkyl, phenyl or $C_7$–$C_{10}$alkylphenyl.

Particular preference is given to mixtures of compounds of the formulae I and II in which n is 1;

$R_7$ and $R'_7$ are hydrogen; $C_1$–$C_{18}$alkyl; $C_1$–$C_{12}$alkyl which is substituted by OH, $C_1$–$C_{18}$alkoxy, —COOR$_8$, —CON(R$_9$)(R$_{10}$), phenoxy and/or —OCOR$_{11}$; glycidyl or benzyl; or $R_7$ is —(CH$_2$CHR$_{15}$—O)$_i$—R$_{18}$ or —CH$_2$—CH(OH)—

$CH_2-O-(CH_2CHR_{15}-O)_i-R_{18}$, where i is a number in the range 2–12;

$R_8$ is $C_1-C_{12}$alkyl; $C_3-C_{12}$alkenyl; $C_6-C_{20}$alkyl which is interrupted by O and/or is substituted by OH; or $C_1-C_4$alkyl which is substituted by $-P(O)(OR_{14})_2$;

$R_9$ and $R_{10}$ are $C_4-C_8$alkyl;

$R_{11}$ is $C_1-C_8$alkyl or $C_2-C_3$alkenyl; or is $C_3-C_{20}$alkyl which is interrupted by $-O-$ and may be substituted by OH;

$R_{14}$ is $C_1-C_4$alkyl;

$R_{15}$ is hydrogen; and $R_{18}$ is H, $C_1-C_{18}$alkyl, phenyl or $C_7-C_{10}$alkylphenyl.

Of these, particular preference is given to those in which n is 1;

$R_1$ and $R_2$, independently of one another, are hydrogen, methyl or methoxy;

$R'_1$ and $R'_2$, independently of one another, are hydrogen or methyl;

$R_3$ and $R_4$, independently of one another, are H, Cl, $C_1-C_4$alkyl, allyl, $C_1-C_4$alkoxy or phenyl;

$R_6$ is hydrogen;

$R_7$ and $R'_7$ are $C_1-C_{18}$alkyl or benzyl; or are $C_2-C_6$alkyl which is substituted by OH, $C_1-C_{18}$alkoxy, phenoxy, $-COOR_8$ and/or $OCOR_{11}$;

$R_8$ is $C_1-C_8$alkyl or $C_3-C_8$alkenyl; and $R_{11}$ is $C_1-C_4$alkyl or $C_2-C_3$alkenyl.

A subject-matter of particularly emphasized interest is a mixture of compounds of the formulae I and II in which n is 1;

$R_1$ and $R_2$, independently of one another, are hydrogen, methoxy or methyl;

$R'_1$ and $R'_2$ are hydrogen;

$R_3$ and $R_4$, independently of one another, are hydrogen, phenyl, methoxy or methyl;

$R_6$ is hydrogen;

$R_7$ and $R'_7$, independently of one another, are $C_1-C_{18}$alkyl, or a $-CH_2CH(OH)CH_2O-R_{19}$ group; and $R_{19}$ is $C_1-C_{18}$alkyl, phenyl or $C_3-C_5$alkenoyl.

The majority of the compounds of the formulae I and II are known; examples of known compounds include 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2-(2-hydroxy-4-octyloxyphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2hydroxy-3-octyloxypropoxy)phenyl]-4,6-bis(2,4-dimethylphenyl)-1, 3,5-triazine, 2-[2-hydroxy-4-(2-hydroxy-3-dodecyloxypropoxy)phenyl]-4,6-bis(2,4-dimethylphenyl)-1,3,5-triazine, 2-[2-hydroxy-4-(2-hydroxy-3-tridecyloxypropoxy)phenyl]-4,6-bis(2,4-dimethylphenyl)-1, 3,5-triazine (formula I) or 2,4-bis-(2-hydroxy-4-propoxyphenyl)-6-(2,4-dimethylphenyl)-1,3,5-triazine (formula II).

The compounds of the formulae I and II can be prepared, for example, by or analogously to one of the methods indicated in EP-A-434 608 or in the publication by H. Brunetti and C. E. Lüthi, Helv. Chim. Acta 55, 1566 (1972), by Friedel-Crafts addition of halotriazines onto appropriate phenols. This can be followed by a further reaction by known methods to give compounds of the formula I or II in which $R_7$ is not hydrogen; such reactions and processes are described, for example, in EP-A-434 608, page 15, line 11, to page 17, line 1.

The novel mixtures can be obtained from the individual compounds of the formulae I and II by methods known in the art, for example by premixing, joint grinding or joint crystallization. Premixing by incorporation of the compounds of the formulae I and II into the substrate to be stabilized is also possible; the incorporation of the individual compounds can be carried out simultaneously or successively, for example by joint extrusion. It is also possible to prepare a mixture of compounds of the formulae I and II by joint synthesis.

The novel mixture of compounds of the formulae I and II can be used as stabilizer for organic materials against damage by light, oxygen or heat. The novel compounds are very particularly suitable as light stabilizers (UV absorbers).

Particular advantages of the novel mixture include the excellent stability of the stabilized material to weathering and light effects, and the excellent photostability of the incorporated stabilizer mixture. The excellent substrate compatibility of the novel mixture is also worthy of mention.

The materials to be stabilized can be, for example, oils, fats, waxes, cosmetics or biocides. Of particular interest is their use in polymeric materials, such as plastics, rubbers, paints, photographic material or adhesives. Examples of polymers and other substrates which can be stabilized in this way are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl aceate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic arthydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene aliamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyestefimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose buryrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The invention therefore also relates to a composition comprising

A) an organic material which is sensitive to damage by light, oxygen and/or heat, and B) as stabilizer, a mixture comprising a compound of the formula I and a compound of the formula II.

The invention also relates to a process for stabilizing organic material against damage by light, oxygen and/or heat, which comprises adding thereto, as stabilizer, a mixture comprising a compound of the formula I and a compound of the formula II, and to the use of a mixture comprising a compound of the formula I and a compound of the formula II for stabilizing organic material.

The amount of stabilizer to be used depends on the organic material to be stabilized and on the intended use of the stabilized material. In general, the novel composition comprises from 0.01 to 15 parts by weight, in particular from 0.05 to 10 parts by weight, especially from 0.05 to 5 parts by weight, of the stabilizer (component B) per 100 parts by weight of component A.

The stabilizer (component B) can also be a mixture of three or more compounds, with the proviso that at least one compound of the type of the formula I and at least one compound of the type of the formula II are present. In addition to the novel compound mixture, the novel compositions can also comprise other stabilizers or other additives, for example antioxidants, further light stabilizers, metal deactivators, phosphites or phosphonites. Examples of these stabilizers are the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec- 1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O- , N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3, 5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis-[4-( 1,1,3, 3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)1,3, 5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)- 1,3,5-triazine, 1,3,5-tris(3,5-di-tert-butyl-4-hydroxyphenylpropionyl)-hexahydro-1,3,5-triazine, 1,3,5-tris (3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenealiamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbon -2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonyl-ethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-( 1,1,3,3- tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis (4-tert-butylbenzoyl) resorcinol, benzoyl resorcinol, 2,4-ditertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate,
bis(2,2,6,6-tetramethyl-4-piperidyl)succinate,
bis(1,2,2,6,6-pentamethyl-4-piperidyl)sebacate,
bis(1-octyloxy-2,2,6,6-tetramethyl-4-piperidyl)sebacate,
bis(1,2,2,6,6-pentamethyl-4-piperidyl) n-butyl-3,5-di-tert-butyl-4-hydroxybenzylmalonate,
the condensate of 1-(2-hydroxyethyl)-2,2,6,6-tetramethyl-4-hydroxypiperidine and succinic acid,
the condensate of N,N'-bis(2,2,6,6-tetramethyl-4-piperidyl) hexamethylenediamine and 4-tert-octylamino-2,6-dichloro-1,3,5-triazine,
tris(2,2,6,6-tetramethyl-4-piperidyl)nitrilotriacetate,
tetrakis(2,2,6,6-tetramethyl-4-piperidyl)-1,2,3,4-butane-tetracarboxylate,
1,1'-(1,2-ethanediyl)bis(3,3,5,5-tetramethylpiperazinone),
4-benzoyl-2,2,6,6-tetramethylpiperidine,
4-stearyloxy-2,2,6,6-tetramethylpiperidine,
bis(1,2,2,6,6-pentamethylpiperidyl)-2m-butyl-2-(2-hydroxy-3,5-di-tert-butylbenzyl)malonate,
3-n-octyl-7,7,9,9-tetramethyl-1,3,8-triazaspiro[4.5]decan-2,4-dion,
bis(1-octyloxy-2,2,6,6-tetramethylpiperidyl)sebacate,
bis(1-octyloxy-2,2,6,6-tetramethylpiperidyl)succinate,
the condensate of N,N'-bis-(2,2,6,6-tetramethyl-4-piperidyl) hexamethylenediamine and 4-morpholino-2,6-dichloro-1,3,5-triazine,
the condensate of 2-chloro-4,6-bis(4-n-butylamino-2,2,6,6-tetramethylpiperidyl )-1,3,5-triazine and 1,2-bis(3-aminopropylamino)ethane,
the condensate of 2-chloro-4,6-di-(4-n-butylamino-1,2,2,6,6-pentamethylpiperidyl)-1,3,5-triazine and 1,2-bis-(3-aminopropylamino)ethane,
8-acetyl-3-dodecyl-7,7,9,9-tetramethyl-1,3,8-triazaspiro [4.5]decane-2,4-dione,
3-dodecyl-1-(2,2,6,6-tetramethyl-4-piperidyl)pyrrolidin-2,5-dione,
3-dodecyl-1-(1,2,2,6,6-pentamethyl-4-piperidyl) pyrrolidine-2,5-dione,
a mixture of 4-hexadecyloxy- and 4-stearyloxy-2,2,6,6-tetramethylpiperidine,
a condensation product of N,N'-bis(2,2,6,6-tetramethyl-4-piperidyl)hexamethylenediamine and 4-cyclohexylamino-2,6-dichloro-1,3,5-triazine,
a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]);
N-(2,2,6,6-tetramethyl-4-piperidyl)-n-dodecylsuccinimid,
N-(1,2,2,6,6-pentamethyl-4-piperidyl)-n-dodecylsuccinimid,
2-undecyl-7,7,9,9-tetramethyl-1-oxa-3,8-diaza-4-oxo-spiro [4,5]decane,
a reaction product of 7,7,9,9-tetramethyl-2-cycloundecyl-1-oxa-3,8-diaza-4-oxospiro [4,5]decane and epichlorohydrin,
propanedioic acid (4-methoxyphenyl)-methylene-bis(1,2,2,6,6-pentamethyl-4-piperidyl) ester,
N,N'-bis-formyl-N,N'-bis(2,2,6,6-tetramethyl-4-piperidyl)-hexamethylenediamine,
poly-[methylpropyl-3-oxy-4-(2,2,6,6-tetramethyl-4-piperidyl)]-siloxane,
a reaction product of maleic acid-α-olefin copolymer and 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyl-oxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, memaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flame-proofing agents, antistatic agents and blowing agents.

14. Benzofuranones and indolinones, for example those disclosed in U.S. Pat. Nos. 4 325 863, 4 338 244, 5 175 312, 5 216 052, 5 252 643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The type and amount of the further stabilizers added is determined by the type of substrate to be stabilized and on its intended use; frequently, from 0.1 to 5% by weight, based on the polymer to be stabilized, are used.

The novel stabilizer mixture can particularly advantageously be employed in compositions in which component A is a synthetic organic polymer, in particular a thermoplastic polymer, a binder for surface coatings, for example paints, or a photographic material. Examples of thermoplastic polymers are polyolefins and polymers containing hetero atoms in the main chain. Preference is also given to compositions in which component A is a thermoplastic polymer containing nitrogen, oxygen and/or sulfur, in particular nitrogen or oxygen, in the main chain. Examples of such polymers are the following classes of thermoplastic polymers:

1. Polyacetals, such as polyoxymethylene, and polyoxymethylenes containing comonomers, for example ethylene oxide; polyacetals which have been modified with thermoplastic polyurethanes, acrylates or MBS.

2. Polyphenylene oxides and sulfides, and mixtures thereof with styrene polymers or polyamides.

3. Polyamides and copolyamides, for example those derived from diamines and dicarboxylic acids and/or from aminocarboxylic acids or the corresponding lactams, such as nylon 4, nylon 6, nylon 6/6, 6/10, 6/9, 6/12, 4/6, nylon 11, nylon 12, aromatic polyamides derived from m-xylene, aliamine and adipic acid; polyamides prepared from hexamethylenediamine and iso- and/or terephthalic acid and, if desired, an elastomer as modifier, for example poly-2,4,4-trimethylhexamethyleneterephthalamide, poly-m-phenyleneisophthalamide; block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol; furthermore polyamides or copolyamides modified with EPDM or ABS; and polyamides condensed during processing ("RIM polyamide systems").

4. Polyureas, polyimides, polyamide-imides and polybenzimidazoles.

5. Polyesters, for example those derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and block polyether-esters derived from polyethers containing hydroxyl terminal groups; furthermore polyesters modified with polycarbonates or MBS.

6. Polycarbonates and polyester carbonates, in particular aromatic polycarbonates, for example those based on 2,2-bis(4-hydroxyphenyl)propane or 1,1-bis(4-hydroxyphenyl)cyclohexane.

7. Polysulfones, polyether sulfones and polyether ketones, in particular aromatic polymers from this class.

8. Mixtures (polyblends) of such polymers with one another or with other polymers, for example with polyolefins, polyacrylates, polydienes or other elastomers as impact modifiers.

Of these, preference is given to polycarbonates, polyesters, polyamides, polyacetals, polyphenylene oxides and polyphenylene sulfides, but in particular to polycarbonates. These are taken to mean, in particular, polymers whose constitutional recurring unit conforms to the formula

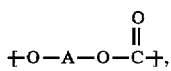

in which A is a divalent phenolic radical. Examples of A are mentioned, inter alia, in U.S. Pat. No. 4 960 863 and DE-A-3 922 496. A can be derived, for example, from hydroquinone, resorcinol, from dihydroxybiphenyls or bisphenols in the broadest sense, such as bis(hydroxyphenyl)alkanes, -cycloalkanes, sulfides, ethers, ketones, sulfones, sulfoxides, α,α'-bis(hydroxyphenyl)diisopropylbenzenes, for example from the compounds 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane, or from the compounds of the formulae

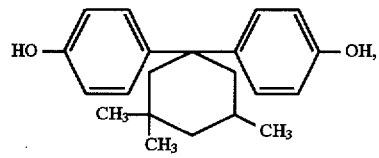

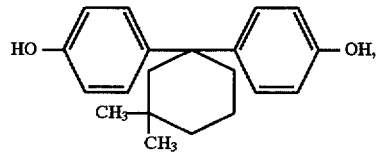

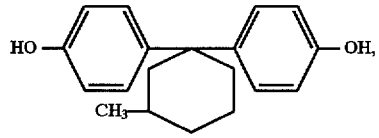

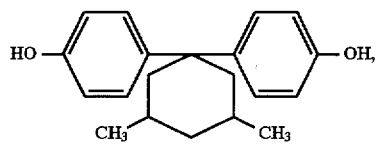

-continued

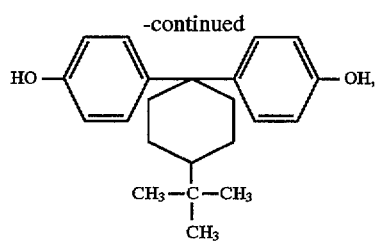

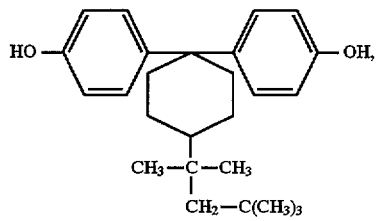

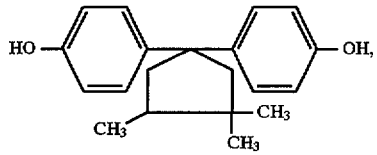

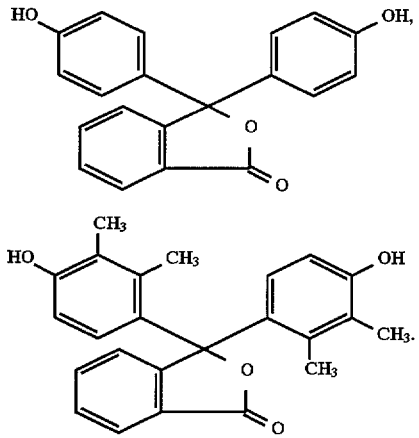

The polymers of component (A) can be linear or branched. Shaping of these polymers is carried out at a relatively high temperature, for example polycarbonate is injection-moulded at 220°–330° C. At these temperatures, most conventional light stabilizers and antioxidants are unstable and begin to decompose. However, the abovementioned novel triazine derivatives are extremely heat-stable and are therefore particularly suitable for stabilizing said polymers.

Also of interest are compositions in which component (A) is a polyolefin, for example polyethylene or polypropylene.

Incorporation into the organic polymers, for example in the synthetic organic, in particular thermoplastic polymers, can be carried out by addition of the novel mixtures and any further additives by the methods conventional in industry. The incorporation can expediently be carried out before or during shaping, for example by mixing the pulverulent components or by addition of the stabilizer to the melt or solution of the polymers, or by application of the dissolved or dispersed compounds to the polymer, if desired with subsequent evaporation of the solvent. In the case of elastomers, these can also be stabilized as lattices. Another way of incorporating the novel mixtures into polymers comprises adding them before or during the polymerization of the corresponding monomers or before the crosslinking.

The novel mixtures can also be added to the plastics to be stabilized in the form of a masterbatch which comprises these compounds, for example, in a concentration of from 2.5 to 25% by weight.

The novel mixtures can expediently be incorporated by the following methods:

- as an emulsion or dispersion (for example to lattices or emulsion polymers)
- as a dry mix during mixing of additional components or polymer mixtures
- by direct addition into the processing equipment (for example extruder, internal mixer, etc.)
- as a solution or melt.

The stabilized polymer compositions obtained in this way can be converted into shaped articles, for example fibres, films, tapes, sheets, sandwich boards, containers, pipes and other profiles, by conventional methods, for example by hot pressing, spinning, extrusion or injection moulding.

The invention therefore furthermore relates to the use of the novel polymer composition for the production of a shaped article.

Also of interest is the use in multilayer systems. In this case, a novel polymer composition having a relatively high content of novel stabilizer, for example 5–15% by weight, is applied in a thin film (10–100 μm) to a shaped article made from a polymer containing little or no stabilizer of the formula I. The application can be carried out at the same time as the shaping of the base structure, for example by coextrusion. However, the application can also take place to the ready-shaped base structure, for example by lamination with a film or by coating with a solution. The outer layer or layers of the finished article have the function of a UV filter which protects the interior of the article against UV light. The outer layer preferably comprises 5–15% by weight, in particular 5–10% by weight, of at least one compound of the formula I and of a compound of the formula II.

The polymers stabilized in this way are distinguished by high weathering resistance, in particular by high resistance to UV light. This enables them to retain their mechanical properties and their colour and gloss even when used outside for extended periods.

Likewise of particular interest is the use of the novel mixtures comprising compounds of the formula I and formula II as stabilizers for coatings, for example for paints. The invention therefore also relates to compositions whose component A is a film-forming binder for coatings.

The novel coating composition preferably comprises 0.01–10 parts by weight of B, in particular 0.05–10 parts by weight of B, especially 0.1–5 parts by weight of B, per 100 parts by weight of solid binder A.

Multilayer systems are also possible here, where the concentration of the novel stabilizer mixture (component B) in the outer layer can be higher, for example from 1 to 15 parts by weight of B, especially 3–10 parts by weight of B, per 100 parts by weight of solid binder A.

The use of the novel mixture as stabilizer in coatings has the additional advantage that delamination, i.e. peeling-off of the coating from the substrate, is prevented. This advantage is particularly important in the case of metallic substrates, including in the case of multilayer systems on metallic substrates.

The binder (component A) can in principle be any binder which is customary in industry, for example those as described in Ullmann's Encyclopedia of Industrial Chemistry, 5th Edn., Vol. A18, pp. 368–426, VCH, Weinheim, 1991. In general, this is a film-forming binder based on a thermoplastic or thermosetting resin, predominantly based on a thermosetting resin. Examples thereof are alkyd, acrylic, polyester, phenolic, melamine, epoxy and polyurethane resins and mixtures thereof.

Component A can be a cold-curable or hot-curable binder; it may be advantageous to add a curing catalyst. Suitable catalysts which accelerate curing of the binder are described, for example, in Ullmann's Encyclopedia of Industrial Chemistry, Vol. A 18, p. 469, VCH Verlagsgesellschaft, Weinheim, 1991.

Preference is given to coating compositions in which component A is a binder comprising a functional acrylate resin and a crosslinking agent.

Examples of coating compositions containing specific binders are:

1. Paints based on cold- or hot-crosslinkable alkyd, acrylate, polyester, epoxy or melamine resins, or mixtures of such resins, if desired with addition of a curing catalyst;

2. Two-component polyurethane paints based on hydroxyl-containing acrylate, polyester or polyether resins and aliphatic or aromatic isocyanates, isocyanurates or polyisocyanates;

3. One-component polyurethane paints based on blocked isocyanates, isocyanurates or polyisocyanates which are deblocked during baking;

4. Two-component paints based on (poly)ketimines and aliphatic or aromatic isocyanates, isocyanurates or polyisocyanates;

5. Two-component paints based on (poly)ketimines and an unsaturated acrylate resin or a polyacetoacetate resin or a methacrylamidoglycolate methyl ester;

6. Two-component paints based on carboxyl- or amino-containing polyacrylates and polyepoxides;

7. Two-component paints based on anydride-containing acrylate resins and a polyhydroxyl or polyamino component;

8. Two-component paints based on acrylate-containing anhydrides and polyepoxides;

9. Two-component paints based on (poly)oxazolines and anhydride-containing acrylate resins or unsaturated acrylate resins or aliphatic or aromatic isocyanates, isocyanurates or polyisocyanates;

10. Two-component paints based on unsaturated polyacrylates and polymalonates;

11. Thermoplastic polyacrylate paints based on thermoplastic acrylate resins or externally crosslinking acrylate resins in combination with etherified melamine resins;

12. Paint systems based on siloxane-modified or fluorine-modified acrylate resins.

In addition to components A and B, the novel coating composition preferably comprises, as component C, a light stabilizer of the sterically hindered amine and/or 2-hydroxyphenyl-2H-benzotriazole type, for example as mentioned in the above list under points 2.1, and 2.6.

In order to achieve maximum light stability, it is of particular interest to add sterically hindered amines, as mentioned in the above list under 2.6. The invention therefore also relates to a coating composition which, in addition to components A and B, comprises, as component C, a light stabilizer of the sterically hindered amine type.

This is preferably a 2,2,6,6-tetraalkylpiperidine derivative containing at least one group of the formula

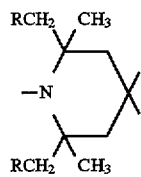

in which R is hydrogen or methyl, in particular hydrogen.

Component C is preferably used in an amount of 0.05–5 parts by weight, per 100 parts by weight of the solid binder.

Examples of tetraalkylpiperidine derivatives which can be used as component C are given in EP-A-356 677, pages 3–17, sections a) to f). These sections of this EP-A are regarded as part of the present description. It is particularly expedient to employ the following tetraalkylpiperidine derivatives:

bis(2,2,6,6-tetramethylpiperidin-4-yl) succinate,
bis(2,2,6,6-tetramethylpiperidin-4-yl) sebacate,
bis(1,2,2,6,6-pentamethylpiperidin-4-yl) sebacate,
di(1,2,2,6,6-pentamethylpiperidin-4-yl) butyl(3,5-di-tert-butyl-4-hydroxybenzyl)malonate,
bis(1-octyloxy-2,2,6,6-tetramethylpiperidin-4-yl) sebacate,
tetra(2,2,6,6-tetramethylpiperidin-4-yl) butane-1,2,3,4-tetracarboxylate,
tetra(1,2,2,6,6-pentamethylpiperidin-4-yl) butane-1,2,3,4-tetracarboxylate,
2,2,4,4-tetramethyl-7-oxa-3,20-diaza-21 -oxodispiro [5.1.11.2]heneicosane,
8-acetyl-3-dodecyl-1,3,8-triaza-7,7,9,9-tetramethylspiro[4, 5]decane-2,4-dione,
or a compound of the formulae

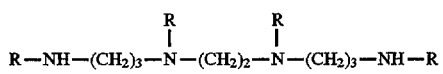

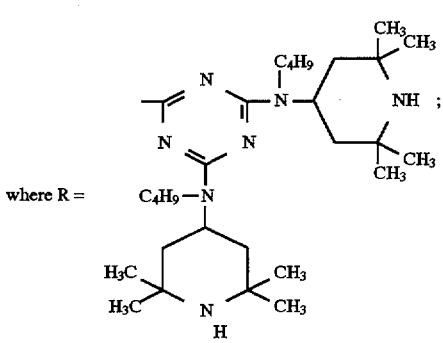

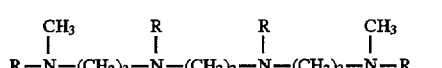

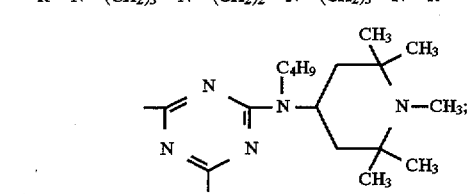

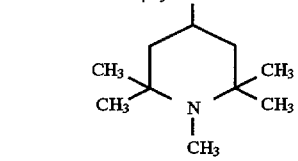

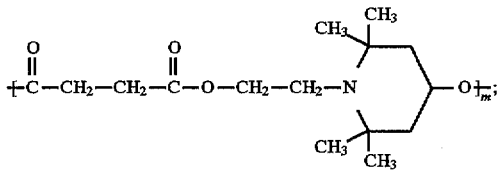

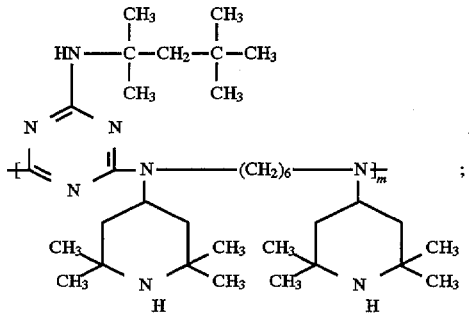

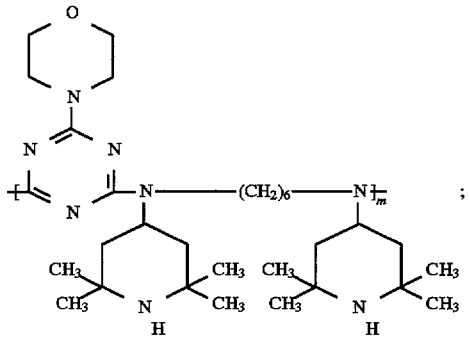

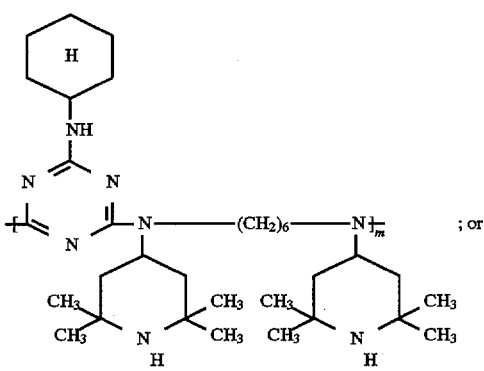

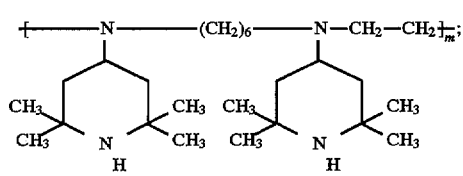

where m has a value of 5–50.

In addition to components A, B and, if used, C, the coating composition can comprise further components, for example solvents, pigments, dyes, plasticizers, stabilizers, thixotropic agents, drying catalysts and/or flow-control agents. Examples of possible components are those as described in Ullmann's Encyclopedia of Industrial Chemistry, 5th Edn., Vol. A18, pp. 429–471, VCH, Weinheim, 1991.

Possible drying catalysts or curing catalysts are, for example, organometallic compounds, amines, amino-containing resins and/or phosphines. Examples of organometallic compounds are metal carboxylates, in particular those of the metals Pb, Mn, Co, Zn, Zr and Cu, or metal chelates, in particular those of the metals Al, Ti and Zr, or organometallic compounds, for example organotin compounds.

Examples of metal carboxylates are the stearates of Pb, Mn and Zn, the octanoates of Co, Zn and Cu, the naphthenates of Mn and Co and the corresponding linoleates, resinates and tallates.

Examples of metal chelates are the aluminium, titanium and zirconium chelates of acetylacetone, ethyl acetylacetate, salicyl aldehyde, salicyl aldoxime, o-hydroxyacetophenone and ethyl trifluoroacetylacetate, and the alkoxides of these metals.

Examples of organotin compounds are dibutyltin oxide, dibutyltin dilaurate and dibutyltin dioctanoate.

Examples of amines are in particular tertiary amines, for example tributylamine, triethanolamine, N-methyldiethanolamine, N-dimethylethanolamine, N-ethylmorpholine, N-methylmorpholine and diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst can also be a phosphine, for example triphenylphosphine.

The novel coating compositions can also be radiation-curable. In this case, the binder essentially comprises monomeric or oligomeric compounds containing ethylenically unsaturated bonds which are cured, after application, by actinic radiation, i.e. are converted into a crosslinked, high-molecular-weight form. UV-curing systems generally additionally contain a photoinitiator. Corresponding systems are described in the abovementioned publication, Ullmann's Encyclopedia of Industrial Chemistry, 5th Edn. Vol. A18, pages 451–453. In radiation-curable coating compositions, the novel stabilizer mixtures can also be employed without addition of sterically hindered amines.

The novel coating compositions can be applied to any desired substrates, for example to metal, wood, plastic or ceramic materials. They are preferably used as top coat in the painting of automobiles. If the top coat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by conventional processes, for example by brushing, spraying, pouring, dipping or electrophoresis; see also Ullmann's Encyclopedia of Industrial Chemistry, 5th Edn., Vol. A 18, pp. 491–500.

The curing of the coatings can—depending on the binder system—be carried out at room temperature or by warming. The coatings are preferably cured at 50°–150° C., powder coatings also at higher temperatures.

The coatings obtained in accordance with the invention have excellent resistance to the harmful effects of light, oxygen and heat; particular mention should be made of the good light and weathering resistance of the coatings, for example paints, obtained in this way.

The invention therefore also relates to a coating, in particular a paint, which has been stabilized against the harmful effects of light, oxygen and heat by a content of the novel mixture comprising compounds of the formulae I and II. The paint is preferably a top coat for automobiles. The invention furthermore relates to a process for stabilizing a coating based on organic polymers against damage by light, oxygen and/or heat, which comprises admixing a mixture comprising a compound of the formula I and a compound of the formula II with the coating composition, and to the use of a mixture comprising compounds of the formulae I and II in coating compositions as stabilizers against damage by light, oxygen and/or heat.

The coating compositions can comprise an organic solvent or solvent mixture in which the binder is soluble. However, the coating composition can also be an aqueous solution or dispersion. The vehicle can also be a mixture of an organic solvent and water. The coating composition can also be a high-solids paint or contain no solvent (powder paint).

The pigments can be inorganic, organic or metallic pigments. The novel coating compositions preferably contain no pigments and are used as clear coats.

Likewise preferred is the use of the coating composition as top coat for applications in the automobile industry, in particular as a pigmented or unpigmented top coat of the finish. However, use for underlying layers is also possible.

The examples below describe the invention in greater detail without representing a limitation. In the examples, parts and percentages are by weight; room temperature is taken to mean a temperature in the range from 20° to 25° C. These definitions apply unless stated otherwise in each case.

The following compounds are examples of individual compounds of the formula I (the prefix n in each case denotes a straight-chain radical):

Compounds of the

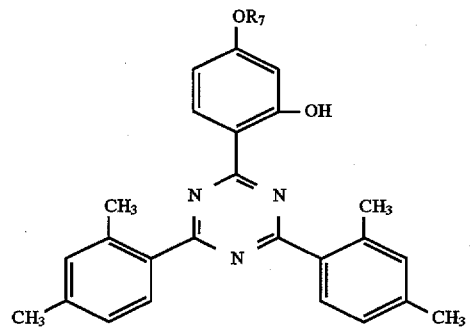

type:

| Compound No. | $R_7$ |
|---|---|
| I/1 | —$CH_2$-phenyl |
| I/2 | —$CH_2CH_2OH$ |
| I/2a | -n-$C_8H_{17}$ |
| I/3 | —$CH_2CH_2OCOCH_3$ |
| I/4 | —$CH_2CH_2OCOCH=CH_2$ |
| I/5 | —$CH_2CH(OH)CH_2O$—n-$C_8H_{17}$ |
| I/5a | —$CH_2CH(OH)CH_2O$—$CH_2$—$CH(C_2H_5)$—$(CH_2)_3$—$CH_3$ |
| I/6 | —$CH_2CH(OH)CH_2O(CH_2)_{11-12}CH_3$ |
| I/7 | —$CH_2CH(OH)CH_2O$ phenyl |
| I/8 | —$CH_2CH(OH)CH_2OCOC(CH_3)=CH_2$ |
| I/8a | —$CH_2CH(OH)CH_2OCOCH=CH_2$ |
| I/9 | —$CH_2$—CH—CH$_2$ (epoxide) |
| I/10 | —$CH_2COOH$ |
| I/11 | —$CH_2CH_2COOC_4H_9$ |
| I/12 | —$CH_2COOC_8H_{17}$ |

-continued

| Compound No. | R₇ |
|---|---|
| I/13 | —CH₂COO(CH₂CH₂O)₇H |
| I/14 | —CH₂COOCH₂CH(CH₃)OCH₂CH(CH₃)OCH(CH₃)CH₃ |
| I/15 | —CH₂COOCH₂P(O)(OC₂H₅)₂ |
| I/16 | —CH₂COOCH₂CH(OH)CH₂P(O)(OC₄H₉)₂ |
| I/17 | —CH₂COO(CH₂)₇CH=CHC₈H₁₇ |
| I/18 | —CH₂COOCH₂CH₂OCH₂CH₂OC₆H₁₃ |
| I/19 | —CH₂CON(C₂H₅)₂ |
| I/20 | —CH₂CH₂CON⟨morpholino⟩ |
| I/21 | —CH₂CONHCH₂CH₂CH₂N(CH₃)₂ |
| I/22 | —CH₂CONHC₈H₁₇ |
| I/23 | —CH₂CON(C₈H₁₇)₂ |
| I/24 | —(CH₂)₇CH₃ |
| I/25 | —(CH₂)₅CH₃ |

Compounds of the

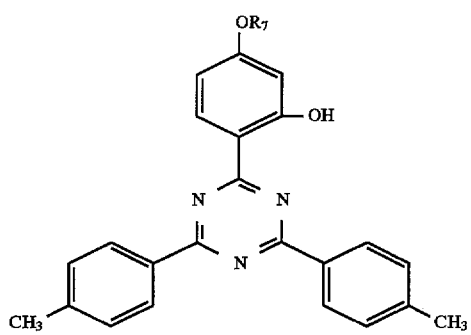

type:

| I/25 | R₇ = | —CH₂COOC₂H₅ |
|---|---|---|
| I/26 | | —CH₂COOCH₂CH₂OCH₃ |
| I/27 | | —CH₂COOCH₂CH=CH-phenyl |
| I/28 | | —CH₂CH(OH)CH₂O(CH₂)₁₁₋₁₂CH₃ (mixture) |
| I/28a | | —CH₂CH(OH)CH₂C₈H₁₇ |
| I/29 | | —CH₂COOCH₂—CH(—O—)CH₂ (glycidyl) |
| I/30 | | —CH₂COOCH₂CH(OH)CH₂OC₈H₁₇ |
| I/31 | | —CH₂phenyl |
| I/32 | | —CH₂CH=CH₂ |
| I/33 | | —CH₂CON(C₄H₉)₂ |
| I/34 | | —CH₂CH₂CONHC₈H₁₇ |
| I/35 | | —(CH₂)₃—CONH-cyclohexyl |
| I/36 | | —(CH₂)₃—CO—N(piperidino) |
| I/37 | | —CO—OC₆H₁₃ |
| I/38 | | —CH₂CH₂Cl |
| I/39 | | —CH₂CH₂CN |

Compounds of the

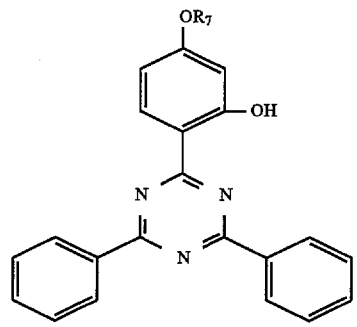

type:

| I/40 | R₇ = | —(CH₂)₅CH₃ |
|---|---|---|
| I/41 | | —CH₂CH(OH)phenyl |
| I/42 | | —CH₂CH(OH)CH₂O(CH₂)₁₁₋₁₂CH₃ (mixture) |
| I/42a | | —CH₂CH(OH)CH₂OC₈H₁₇ |
| I/43 | | —CH₂CH(OH)CH₂OCOphenyl |
| I/44 | | —CH₂CH(CH₃)OCOCH₃ |
| I/45 | | —SO₂—C₁₂H₁₅ |
| I/46 | | —SO₂—C₆H₄—CH₃ |
| I/47 | | —CH₂COOC₁₀H₂₁ |
| I/48 | | —CH₂CONHCH₂CH₂OCH₃ |
| I/49 | | —CH₂CH₂CONHCH₂phenyl |
| I/50 | | —(CH₂)₃CONH(CH₂)₃N(C₂H₅)₂ |
| I/51 | | —CH₂CONHC₁₂H₂₅ |

Compounds of the

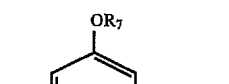

type:

| I/52 | R₇ = | —CH₃ |
|---|---|---|

Compounds of the

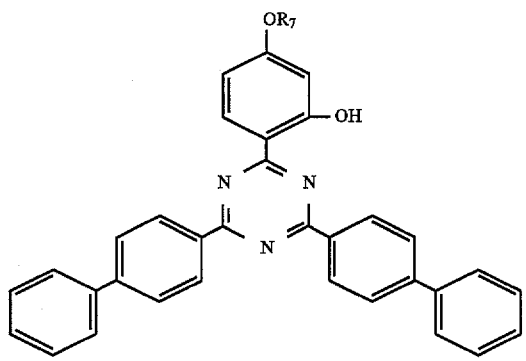

type:

| I/53 | $R_7 =$ | $-CH_3$ |
|---|---|---|
| I/54 | | $-(CH_2)_5-CH_3$ |
| I/55 | | $-CH_2-CH(OH)-CH_2-O-(CH_2)_3-CH_3$ |
| I/56 | | $-(CH_2)_7-CH_3$ |
| I/57 | | $-CH_2CH(OH)CH_2O(CH_2)_{11-12}CH_3$ (mixture) |

The following compounds are examples of individual compounds of the formula II:

Compounds of the

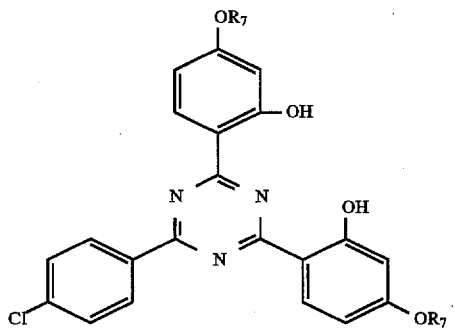

type:

| II/1 | $R_7 =$ | $-CH_2CH(OH)CH_3$ |
|---|---|---|
| II/2 | | $-CH_2CH_2OC_4H_9$ |
| II/3 | | $-CH_2CH_2COC_2H_5$ |
| II/4 | | $-CH_2COOC_8H_{17}$ |
| II/5 | | $-CH_2CH(OH)CH_2OC_4H_9$ |
| II/6 | | $-CH_2CH(OH)CH_2Ophenyl$ |
| II/7 | | $-(CH_2)_5CH_3$ |
| II/8 | | $-(CH_2)_7CH_3$ |

Compounds of the

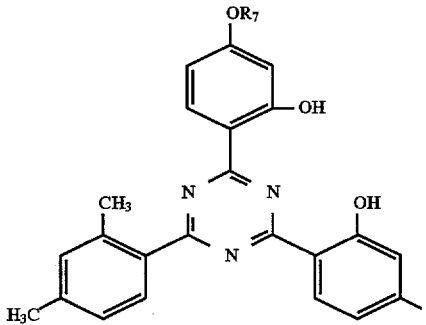

type:

| II/11 | $R_7 =$ | $-CH_2CH(OH)CH_3$ |
|---|---|---|
| II/12 | | $-CH_2CH_2OC_4H_9$ |
| II/13 | | $-CH_2CH_2COC_2H_5$ |
| II/14 | | $-CH_2COOC_8H_{17}$ |
| II/15 | | $-CH_2CH(OH)CH_2OC_4H_9$ |
| II/15a | | $-CH_2CH(OH)CH_2OC_8H_{17}$ |
| II/16 | | $-CH_2CH(OH)CH_2Ophenyl$ |
| II/17 | | $-(CH_2)_5CH_3$ |
| II/18 | | $-(CH_2)_7CH_3$ |

Compounds of the

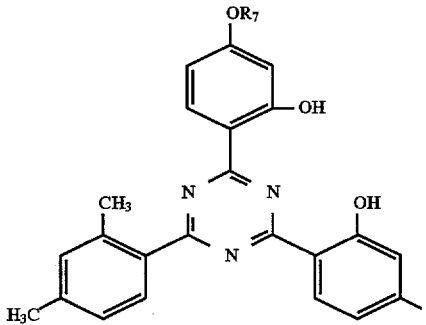

type:

| II/19 | $R_7 =$ | $-n-C_8H_{17}$ |
|---|---|---|
| II/20 | | $-CH_2CH(OH)CH_2OCH_2-CH(C_2H_5)-C_4H_9$ |
| II/21 | | $-CH_2CH(OH)CH_2O-n-C_{12}H_{25}/n-C_{13}H_{27}$ (mixture) |

Compounds of the type:

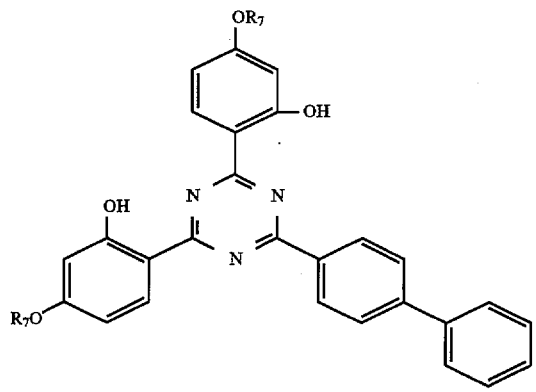

| No. | R₇ |
|---|---|
| II/22 | H |

Compounds of the type:

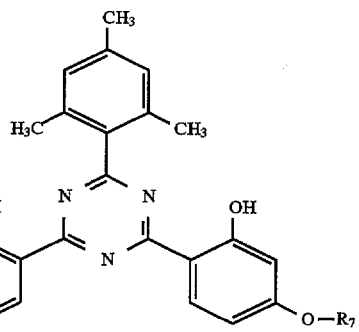

| No. | R₇ |
|---|---|
| II/23 | $CH_2-CH(OH)-CH_2-O-C_2H_5$ |
| II/24 | $CH_2-CH(OH)-CH_2-O-C_4H_9\text{-n}$ |
| II/25 | $CH_2-CH(OH)-CH_2-O-C(CH_3)_3$ |
| II/26 | $CH_2-CH(OH)-CH_2-O-CH_2-CH(CH_3)-CH_3$ |
| II/27 | $CH_2-CH(OH)-CH_2-O-CH(CH_3)-C_2H_5$ |
| II/28 | $CH_2-CH(OH)-CH_2-O-(-CH(CH_3)-C_2H_5/-CH(CH_3)-C_3H_7\text{-n})$ (1:1) |
| II/29 | $CH_2-CH(OH)-CH_2-O-C_6H_{13}\text{-n}$ |
| II/30 | $CH_2-CH(OH)-CH_2-O-CH_2-CH(C_2H_5)-C_4H_9\text{-n}$ |
| II/31 | $CH_2-CH(OH)-CH_2O-C_{12}H_{25}$ (isomer mixture) |
| II/32 | $CH_2-CH(OH)-CH_2-O-C_6H_5$ |
| II/33 | $CH_2-CH(OH)-CH_2-O-(-C_{12}H_{25}/-C_{13}H_{27})$ (isomer mixture) |
| II/34 | $C_6H_{13}\text{-n}$ |
| II/35 | $CH_2-CH(C_2H_5)-C_4H_9\text{-n}$ |
| II/36 | $C_8H_{17}$ (isomer mixture) |
| II/37 | $CH_2-CH(OH)-CH_2-O-(CH_2-CH_2-O-)_{7-8}-CH_3$ |
| II/38 | $CH(CH_3)-CO-O-C_2H_5$ |
| II/39 | $CH(C_4H_9\text{-n})-CO-OC_2H_5$ |
| II/40 | $-(CH_2)_5-CO-O-C_2H_5$ |
| II/41 | $CH(C_2H_5)-CO-OC_2H_5$ |
| II/42 | $CH(CH_3)_2-CO-OC_2H_5$ |
| II/43 | $CH(C_2H_5)-CO-C_8H_{17}$ (isomer mixture) |
| II/44 | $CH_2-CH(O-CO-CH_3)-CH_2-O-C_4H_9\text{-n}$ |
| II/45 | $CH_2-CH(OH)-CH_2-O-CH_2-CH=CH_2$ |
| II/46 | $CH_2-CH(OH)-C_4H_9\text{-n}$ |
| II/47 | $CH_2-CH(OH)-(CH_2)_2-CH=CH_2$ |
| II/48 | $CH_2-CH(OH)-(CH_2)_6-CH=CH_2$ |
| II/49 | 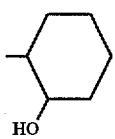 |

Mixtures are prepared as shown in Table A below by dissolving the stated compounds in xylene:

TABLE A

Mixtures of compounds of the formula I and compounds of the formula II in xylene; amounts in parts by weight (pbw)

| Compound of the formula I | Compound of the formula II |
|---|---|
| 1 pbw I/5a | 1 pbw II/17 |
| 1 pbw I/6 | 1 pbw II/17 |
| 1 pbw I/24 | 1 pbw II/17 |
| 1 pbw I/40 | 1 pbw II/17 |
| 3 pbw I/5a | 1 pbw II/17 |
| 3 pbw I/6 | 1 pbw II/17 |
| 3 pbw I/24 | 1 pbw II/17 |
| 3 pbw I/40 | 1 pbw II/17 |
| 1 pbw I/6 | 1 pbw II/21 |
| 1 pbw I/24 | 1 pbw II/19 |
| 1 pbw I/6 | 1 pbw II/19 |
| 2 pbw I/24 | 1 pbw II/21 |
| 3 pbw I/5a | 1 pbw II/15 |
| 1 pbw I/5a | 3 pbw II/15 |

Use examples

1. Gloss retention of a 2-coat metallic finish

The novel stabilizer mixtures are tested in a clear coat having the following composition:

| | |
|---|---|
| Synthacryl ® SC 303[1] | 27.51 |
| Synthacryl ® SC 370[2] | 23.34 |
| Maprenal ® MF 650[3] | 27.29 |
| Butyl acetate/butanol (37/8) | 4.33 |
| Isobutanol | 4.87 |
| Solvesso ® 150[4] | 2.72 |
| Crystal Oil K-30[5] | 8.74 |
| Baysilon ® MA flow-control agent[6] | 1.20 |
| | 100.00g |

[1] Acrylate resin, Hoechst AG; 65% solution in xylene/butanol 26:9
[2] Acrylate resin, Hoechst AG; 75% solution in Solvesso ® 100[4]
[3] Melamine resin. Hoechst AG; 55% solution in isobutanol
[4] Aromatic hydrocarbon mixture, boiling range 182–203° C. (Solvesso ® 150) or 161–178° C. (Solvesso ® 100); manufacturer ESSO
[5] Aliphatic hydrocarbon mixture, boiling range 145–200° C.; manufacturer Shell
[6] 1% in Solvesso ® 150[4]; manufacturer Bayer AG 1.5 % of the mixture to be tested are added to the coating composition as a solution in approx. 5–10 g of xylene, based on the solids content of the varnish.

Some further varnish samples are prepared which, in addition to the novel mixture, contain 0.5% of the compound $$H_3C\begin{matrix}CH_3\\ \end{matrix} \quad H_3C\begin{matrix}CH_3\\ \end{matrix}$$

$$H_3C-N\diagdown\diagup O-\overset{O}{\underset{\|}{C}}-(CH_2)_8-\overset{O}{\underset{\|}{C}}-O\diagdown\diagup N-CH_3$$

$$H_3C\begin{matrix}\\CH_3\end{matrix} \quad H_3C\begin{matrix}\\CH_3\end{matrix}$$

(compound A), based on the solids content of the coating composition. The comparison is a varnish containing no light stabilizer.

The varnish is diluted to spraying consistency using Solvesso® 100 and sprayed onto a prepared aluminium sheet (coil coat, filler, pale-blue metallic base coat) and baked at 130° C. for 30 minutes. A dry film thickness of 40–50 µm of varnish is obtained.

The samples are then weathered in an Arias UVCON® weathering unit (UVB-313 lamps) in a cycle comprising UV irradiation at 70° C. for 8 hours and condensation at 50° C. for 4 hours. Further samples are subjected to outdoor weathering.

The surface gloss (20° gloss as defined in DIN 67530) of the samples is measured at regular intervals. The results are shown in Table 1 below.

TABLE 1

20° gloss as defined in DIN 67530 after UVCON weathering

| Amount of stabilizers | | | 20° gloss after weathering for | | | | |
|---|---|---|---|---|---|---|---|
| Type I | Type II | A | 0 | 400 | 800 | 1200 | 1600 h |
| none | none | none | 87 | 74 | 62 | 24 | |
| 0.75% I/6 | 0.75% II/21 | none | 87 | 82 | 78 | 62 | |
| 0.75% I/24 | 0.75% II/19 | none | 87 | 79 | 74 | 63 | |
| 0.75% I/6 | 0.75% II/19 | none | 87 | 77 | 68 | 68 | |
| 1.00% I/24 | 0.5% II/21 | none | 87 | 80 | 71 | 71 | |
| 1.125% I/5a | 0.375% II/15 | none | 87 | 79 | 79 | 69 | |
| 0.375% I/5a | 1.125% II/15 | none | 87 | 88 | 81 | 60 | |
| none | none | 0.5% A | 89 | 83 | 68 | 54 | 2* |
| 0.75% I/6 | 0.75% II/21 | 0.5% A | 89 | 90 | 87 | 89 | 89 |
| 0.75% I/24 | 0.75% II/19 | 0.5% A | 89 | 90 | 87 | 91 | |
| 0.75% I/6 | 0.75% II/19 | 0.5% A | 89 | 90 | 87 | 90 | 89 |
| 1.00% I/24 | 0.5% II/21 | 0.5% A | 89 | 90 | 87 | 91 | 89 |
| 1.125% I/5a | 0.375% II/15 | 0.5% A | 89 | 89 | 87 | 90 | 88 |
| 0.375% I/5a | 1.125% II/15 | 0.5% A | 89 | 90 | 88 | 91 | 89 |

*cracking

The samples stabilized in accordance with the invention have better weathering stability (gloss retention, cracking resistance) than the unstabilized comparative sample.

2. Loss of UV absorber during weathering

A clear coat as described under 1. is sprayed onto prepared glass plates and baked at 130° C. for 30 minutes. A dry film thickness of 20 µm of coating is obtained.

The samples are then weathered in an Atlas UVCON® weathering unit (UVB-313 lamps) in a cycle comprising UV irradiation at 70° C. for 8 hours and condensation at 50° C. for 4 hours. Before the weathering and after weathering for 2000 hours, the loss of UV absorber is measured with the aid of a UV/VIS spectrometer (Perkin-Elmer, Lambda 5; change in absorption at the long-wave maximum). The results are shown in Table 2 below.

TABLE 2

Loss of UV absorber after UVCON weathering for 2000 hours

| Amount of stabilizers | | Measurement wavelength | Loss |
|---|---|---|---|
| Type I | Type II | [nm] | [%] |
| 1.5% I/6 | none | 339 | 36.1 |
| none | 1.5% II/21 | 355 | 43.1 |
| 0.75% I/6 | 0.75% II/21 | 345 | 29.1 |

It is evident from the results in Table 2 that the loss of UV absorber can be considerably reduced when the novel mixture is employed.

What is claimed is:

1. A mixture comprising a compound of the formula I

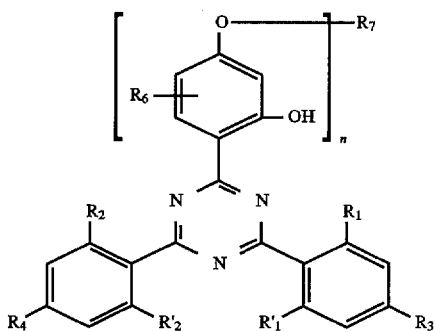

and a compound of the formula II

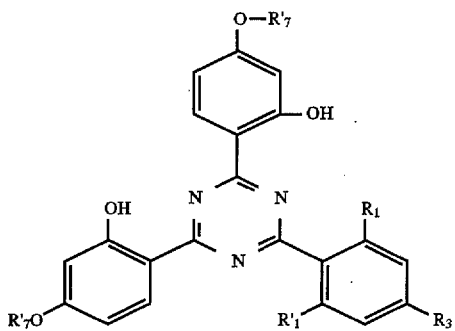

in which n is 1 or 2;

$R_1$, $R'_1$, $R_2$ and $R'_2$, independently of one another, are H, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_1$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_3$ and $R_4$, independently of one another, are H, $C_1$–$C_{12}$alkyl; $C_2$–$C_6$alkenyl; $C_1$–$C_{12}$alkoxy; $C_5$–$C_{12}$cycloalkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_6$ is hydrogen, $C_1$–$C_{24}$alkyl, $C_5$–$C_{12}$cycloalkyl or $C_7$–$C_{15}$phenylalkyl;

$R_7$, in the case where n=1, and $R'_7$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_8$, —CONH$_2$, —CONHR$_9$, —CON(R$_9$) (R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O— and may be substituted by OH; or $R_7$ is $C_3$–$C_6$alkenyl; glycidyl; $C_5$–$C_{12}$cycloalkyl; cyclohexyl which is substituted by OH, $C_1$–$C_4$alkyl or —OCOR$_{11}$; $C_7$–$C_{11}$phenylalkyl which is unsubstituted or substituted by OH, Cl or CH$_3$; —CO—R$_{12}$ or —SO$_2$—R$_{13}$;

$R_7$, in the case where n=2, is $C_2$–$C_{16}$alkylene, $C_4$–$C_{12}$alkenylene, xylylene, $C_3$–$C_{20}$alkylene which is interrupted by O and/or substituted by OH, or is a group of the formula —CH$_2$CH(OH)CH$_2$O—R$_{20}$—OCH$_2$CH(OH)CH$_2$—, —CO—R$_{21}$—CO—, —CO—NH—R$_{22}$—NH—CO— or —(CH$_2$)$_m$—COO—R$_{23}$—OOC—(CH$_2$)$_m$—, in which m is a number in the range from 1 to 3, or is

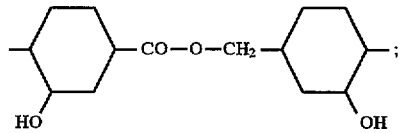

$R_8$ is $C_1$–$C_{18}$alkyl; $C_2$–$C_{18}$alkenyl; $C_3$–$C_{50}$alkyl which is interrupted by O, NH, NR$_9$ or S and/or is substituted by OH; $C_1$–$C_4$alkyl which is substituted by —P(O)(OR$_{14}$)$_2$, —N(R$_9$)(R$_{10}$) or —OCOR$_{11}$ and/or OH; glycidyl; cyclohexyl; phenyl; $C_7$–$C_{14}$alkylphenyl or $C_7$–$C_{11}$phenylalkyl;

$R_9$ and $R_{10}$, independently of one another, are $C_1$–$C_{12}$alkyl; $C_3$–$C_{12}$alkoxyalkyl; $C_4$–$C_{16}$dialkylaminoalkyl or $C_5$–$C_{12}$cycloalkyl, or $R_9$ and $R_{10}$ together are $C_1$–$C_{18}$alkylene or -oxaalkylene or -azaalkylene;

$R_{11}$ is $C_1$–$C_{18}$alkyl; $C_1$–$C_{18}$alkenyl or phenyl; or is $C_3$–$C_{50}$alkyl which is interrupted by —O— and may be substituted by OH;

$R_{12}$ is $C_1$–$C_{18}$alkyl; $C_2$–$C_{18}$alkenyl; phenyl; $C_1$–$C_{18}$alkoxy; $C_3$–$C_{18}$alkenyloxy; $C_3$–$C_{50}$alkoxy which is interrupted by O, NH, NR$_9$ or S and/or substituted by OH; cyclohexyloxy; $C_7$–$C_{14}$alkylphenoxy; $C_7$–$C_{11}$phenylalkoxy; phenoxy; $C_1$–$C_{12}$alkylamino; phenylamino; tolylamino or naphthylamino;

$R_{13}$ is $C_1$–$C_{12}$alkyl; phenyl; naphthyl or $C_7$–$C_{14}$alkylphenyl;
$R_{14}$ is $C_1$–$C_{12}$alkyl, methylphenyl or phenyl;
$R_{20}$ is $C_2$–$C_{10}$alkylene; $C_4$–$C_{50}$alkylene which is interrupted by O, phenylene or a -phenylene-X-phenylene- group, in which X is —O—, —S—, —SO$_2$—, —CH$_2$— or —C(CH$_3$)$_2$—;
$R_{21}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;
$R_{22}$ is $C_2$–$C_{10}$alkylene, phenylene, tolylene, diphenylenemethane or a

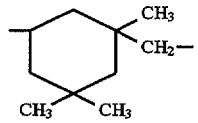

group; and
$R_{23}$ is $C_2$–$C_{10}$alkylene or $C_4$–$C_{20}$alkylene which is interrupted by O.

2. A mixture according to claim 1, comprising from 0.2 to 5 parts by weight of compound of the formula II per part by weight of compound of the formula I.

3. A mixture according to claim 1, in which, in the formulae I and II, $R_1$, $R'_1$, $R'_2$ and $R_2$, independently of one another, are H, $C_1$–$C_4$alkoxy or $C_1$–$C_4$alkyl;

$R_3$ and $R_4$, independently of one another, are H, $C_1$–$C_{12}$alkyl, $C_2$–$C_6$alkenyl, $C_1$–$C_{12}$alkoxy, Cl, F, phenyl or phenoxy;

$R_7$, in the case where n=1, and $R'_7$ are hydrogen, $C_1$–$C_{18}$alkyl, allyl, glycidyl or benzyl; or are $C_1$–$C_{12}$alkyl which is substituted by OH, $C_1$–$C_{18}$alkoxy, phenoxy, —COOR$_8$, —CONHR$_9$, —CON(R$_9$)(R$_{10}$) and/or —OCOR$_{11}$; or $R_7$ is —(CH$_2$CHR$_{15}$—O)$_i$—R$_{18}$ or —CH$_2$—CH(OH)—CH$_2$—O—(CH$_2$CHR$_{15}$—O)$_i$—R$_{18}$, where i is a number in the range from 1 to 12;

$R_7$, in the case where n=2, is $C_2$–$C_6$alkylene, $C_4$–$C_{12}$alkenylene, xylylene, or $C_3$–$C_{20}$alkylene which is interrupted by O and/or is substituted by OH;

$R_8$ is $C_1$–$C_{12}$alkyl; $C_3$–$C_{18}$alkenyl; $C_3$–$C_{20}$alkyl which is interrupted by O and/or is substituted by OH; or $C_1$–$C_4$alkyl which is substituted by —P(O)(OR$_{14}$)$_2$;

$R_9$ and $R_{10}$, independently of one another, are $C_1$–$C_{18}$alkyl or cyclohexyl; or $R_9$ and $R_{10}$ together are pentamethylene or 3-oxapentamethylene;

$R_{11}$ is $C_1$–$C_8$alkyl, $C_2$–$C_5$alkenyl or phenyl; or is $C_3$–$C_{20}$alkyl which is interrupted by —O— and may be substituted by OH;

$R_{14}$ is $C_1$–$C_4$alkyl;

$R_{15}$ is H or methyl; and $R_{18}$ is H, $C_1$–$C_{18}$alkyl, phenyl or $C_7$–$C_{10}$alkylphenyl.

4. A mixture according to claim 1, in which, in the formulae I and II, n is 1;

$R_7$ and $R'_7$ are hydrogen; $C_1$–$C_{18}$alkyl, $C_1$–$C_{12}$alkyl which is substituted by OH, $C_1$–$C_{18}$alkoxy, —COOR$_8$, —CON($R_9$)($R_{10}$), phenoxy and/or —OCOR$_{11}$; glycidyl or benzyl; or $R_7$ is —(CH$_2$CHR$_{15}$—O)$_i$—R$_{18}$ or —CH$_2$—CH(OH)—CH$_2$—O—(CH$_2$CHR$_{15}$—O)$_i$—R$_{18}$, where i is a number in the range from 2–12;

$R_8$ is $C_1$–$C_{12}$alkyl; $C_3$–$C_{12}$alkenyl; $C_6$–$C_{20}$alkyl which is interrupted by O and/or is substituted by OH; or $C_1$–$C_4$alkyl which is substituted by —P(O)(OR$_{14}$)$_2$;

$R_9$ and $R_{10}$ are $C_4$–$C_8$alkyl;

$R_{11}$ is $C_1$–$C_8$alkyl or $C_2$–$C_3$alkenyl; or is $C_3$–$C_{20}$alkyl which is interrupted by —O— and may be substituted by OH;

$R_{14}$ is $C_1$–$C_4$alkyl;

$R_{15}$ is hydrogen; and $R_{18}$ is H, $C_1$–$C_{18}$alkyl, phenyl or $C_7$–$C_{10}$alkylphenyl.

5. A mixture according to claim 1, in which, in the formulae I and II, n is 1;

$R_1$ and $R_2$, independently of one another, are hydrogen, methyl or methoxy;

$R'_1$ and $R'_2$, independently of one another, are hydrogen or methyl;

$R_3$ and $R_4$, independently of one another, are H, Cl, $C_1$–$C_4$alkyl, allyl, $C_1$–$C_4$alkoxy or phenyl;

$R_6$ is hydrogen;

$R_7$ and $R'_7$ are $C_1$–$C_{18}$alkyl or benzyl; or are $C_2$–$C_6$alkyl which is substituted by OH, $C_1$–$C_{18}$alkoxy, phenoxy, —COOR$_8$ and/or OCOR$_{11}$;

$R_8$ is $C_1$–$C_8$alkyl or $C_3$–$C_8$alkenyl; and $R_{11}$ is $C_1$–$C_4$alkyl or $C_2$–$C_3$alkenyl.

6. A mixture as claimed in claim 1, in which, in the formulae I and II, n is 1;

$R_1$ and $R_2$, independently of one another, are hydrogen, methoxy or methyl;

$R'_1$ and $R'_2$ are hydrogen;

$R_3$ and $R_4$, independently of one another, are hydrogen, phenyl, methoxy or methyl;

$R_6$ is hydrogen;

$R_7$ and $R'_7$, independently of one another, are $C_1$–$C_{18}$alkyl, or a —CH$_2$CH(OH)CH$_2$O—R$_{19}$ group; and $R_{19}$ is $C_1$–$C_{18}$alkyl, phenyl or $C_3$–$C_5$alkenoyl.

7. A composition comprising (A) an organic material which is sensitive to damage by light, oxygen and/or heat, and (B) a stabilizer, which is a mixture comprising a compound of the formula I

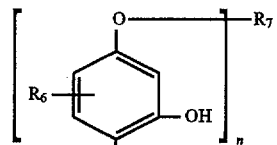

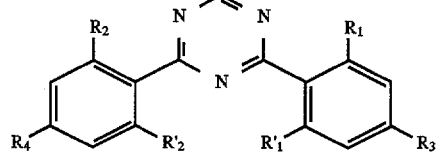

and a compound of the formula II

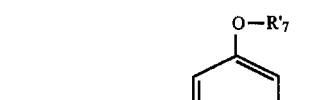

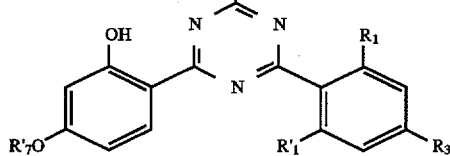

in which n is 1 or 2;

$R_1$, $R'_1$, $R_2$ and $R'_2$, independently of one another, are H, $C_1$–$C_{12}$alkyl; $C_2$–$C_6$alkenyl; $C_1$–$C_{12}$ alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_3$ and $R_4$, independently of one another, are H, $C_1$–$C_{12}$alkyl; $C_2$–$C_6$alkenyl; $C_1$–$C_{12}$alkoxy; $C_5$–$C_{12}$cycloalkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_6$ is hydrogen, $C_1$–$C_{24}$alkyl, $C_5$–$C_{12}$cycloalkyl or $C_7$–$C_{15}$phenylalkyl;

$R_7$, in the case where n=1, and $R'_7$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_8$, —CONH$_2$, —CO$_9$, —CON($R_9$)($R_{10}$), —NH$_2$, —NHR$_9$, —N($R_9$)($R_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O+ and may be substituted by OH; or $R_7$ is $C_3$–$C_6$alkenyl; glycidyl; $C_5$–$C_{12}$cycloalkyl; cyclohexyl which is substituted by OH, $C_1$–$C_4$alkyl or —OCOR$_{11}$; $C_7$–$C_{11}$phenylalkyl which is unsubstituted or substituted by OH, Cl or CH$_3$; —CO—R$_{12}$ or —SO$_2$—R$_{13}$;

$R_7$, in the case where n=2, is $C_2$–$C_{16}$alkylene, $C_4$–$C_{12}$alkenylene, xylylene, $C_3$–$C_{20}$alkylene which is interrupted by O and/or substituted by OH, or is a group of the formula —CH$_2$CH(OH)CH$_2$O—R$_{20}$—OCH$_2$CH(OH)CH$_2$—, —CO—R$_{21}$—CO—, —CO—NH—R$_{22}$—NH—CO— or —(CH$_2$)$_m$—COO—R$_{23}$—OOC—(CH$_2$)$_m$—, in which m is a number in the range from 1 to 3, or is

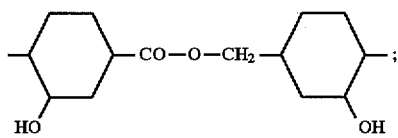 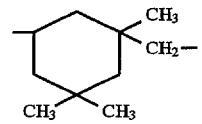

$R_8$ is $C_1$–$C_{18}$alkyl; $C_2$–$C_{18}$alkenyl; $C_3$–$C_{50}$alkyl which is interrupted by O, NH, $NR_9$ or S and/or is substituted by OH; $C_1$–$C_4$alkyl which is substituted by —P(O) $(OR_{14})_2$, —N($R_9$) ($R_{10}$) or —$OCOR_{11}$ and/or OH; glycidyl; cyclohexyl; phenyl; $C_7$–$C_{14}$alkylphenyl or $C_7$–$C_{11}$phenylalkyl;

$R_9$ and $R_{10}$, independently of one another, are $C_1$–$C_{12}$alkyl; $C_3$–$C_{12}$alkoxyalkyl; $C_4$–$C_{16}$dialalkylaminoalkyl or $C_5$–$C_{12}$cycloalkyl, or $R_9$ and $R_{10}$ together are $C_3$–$C_9$alkylene or -oxaalkylene or -azaalkylene;

$R_{11}$ is $C_1$–$C_{18}$alkyl; $C_2$–$C_{18}$alkenyl or phenyl; or is $C_3$–$C_{50}$alkyl which is interrupted by —O— and may be substituted by OH;

$R_{12}$ is $C_1$–$C_{18}$alkyl; $C_2$–$C_{18}$alkenyl; phenyl; $C_1$–$C_{18}$alkoxy; $C_3$–$C_{18}$alkenyloxy; $C_3$–$C_{50}$alkoxy which is interrupted by O, NH, $NR_9$ or S and/or substituted by OH; cyclohexyloxy; $C_7$–$C_{14}$alkylphenoxy; $C_7$–$C_{11}$phenylalkoxy; phenoxy; $C_1$–$C_{12}$alkylamino; phenylamino; tolylamino or naphthylamino;

$R_{13}$ is $C_1$–$C_{12}$alkyl; phenyl; naphthyl or $C_7$–$C_{14}$alkylphenyl; $R_{14}$ is $C_1$–$C_{12}$alkyl, methylphenyl or phenyl;

$R_{20}$ is $C_2$–$C_{10}$alkylene; $C_4$–$C_{50}$alkylene which is interrupted by O, phenylene or a -phenylene-X-phenylene- group, in which X is —O—, —S—, —$SO_2$—, —$CH_2$— or —C($CH_3)_2$—;

$R_{21}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;

$R_{22}$ is $C_2$–$C_{10}$alkylene, phenylene, tolylene, diphenylenemethane or a group; and $R_{23}$ is $C_2$–$C_{10}$alkylene or $C_4$–$C_{20}$alkylene which is interrupted by O.

8. A composition according to claim 7, comprising from 0.01 to 15 parts by weight of component B per 100 parts by weight of component A.

9. A composition according to claim 7, comprising, in addition to components A and B, one or more other stabilizers or other additives.

10. A composition according to claim 7, wherein component A is a synthetic organic polymer.

11. A composition according to claim 7, wherein component A is a thermoplastic polymer, a binder for coatings or a photographic material.

12. A composition according to claim 11, comprising as component A, a binder for coatings and, as further components, one or more stabilizers selected from light stabilizers of the sterically hindered amine and/or 2-hydroxyphenyl-2H-benzotriazole type.

13. A process for stabilizing organic material against damage by light, oxygen and/or heat, which comprises adding thereto, as stabilizer, a mixture according to claim 1 comprising a compound of the formula I and a compound of the formula II.

* * * * *